(12) United States Patent
Kim

(10) Patent No.: US 11,483,458 B2
(45) Date of Patent: Oct. 25, 2022

(54) CAMERA MODULE

(71) Applicant: LG INNOTEK CO., LTD., Seoul (KR)

(72) Inventor: Kwang Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/042,740

(22) PCT Filed: Apr. 11, 2019

(86) PCT No.: PCT/KR2019/004361
§ 371 (c)(1),
(2) Date: Sep. 28, 2020

(87) PCT Pub. No.: WO2019/199079
PCT Pub. Date: Oct. 17, 2019

(65) Prior Publication Data
US 2021/0029280 A1    Jan. 28, 2021

(30) Foreign Application Priority Data

Apr. 11, 2018  (KR) ........................ 10-2018-0042062

(51) Int. Cl.
*H04N 5/225* (2006.01)
*G02B 7/02* (2021.01)

(52) U.S. Cl.
CPC ........... *H04N 5/2254* (2013.01); *G02B 7/025* (2013.01); *H04N 5/2253* (2013.01)

(58) Field of Classification Search
CPC . H01L 27/124; H01L 27/1248; H04N 5/2257; G09F 9/00
See application file for complete search history.

(56) References Cited

U.S. PATENT DOCUMENTS

| 2005/0099703 | A1* | 5/2005 | Hashimoto | G02B 7/025 359/820 |
| 2009/0103193 | A1* | 4/2009 | Berube | G02B 7/025 359/819 |

(Continued)

FOREIGN PATENT DOCUMENTS

| CN | 107690594 A | 2/2018 |
| JP | 2008-076628 A | 4/2008 |

(Continued)

OTHER PUBLICATIONS

International Search Report dated Jul. 17, 2019 in International Application No. PCT/KR2019/004361.

(Continued)

*Primary Examiner* — Sinh Tran
*Assistant Examiner* — Zhenzhen Wu
(74) *Attorney, Agent, or Firm* — Saliwanchik, Lloyd & Eisenschenk

(57) ABSTRACT

A camera module is provided. A camera module according to an aspect of the present invention comprises: a lens barrel accommodating a lens; a lens holder accommodating the lens barrel; an image sensor disposed under the lens barrel; and a printed circuit board having an image sensor mounted thereon and coupled to the lens holder, wherein the lens barrel and the lens holder are primarily coupled to each other in a state where an optical axis of the lens and an optical axis of the image sensor are aligned, and are secondarily coupled to each other in the primarily coupled state.

18 Claims, 17 Drawing Sheets

(56) References Cited

U.S. PATENT DOCUMENTS

| | | | | |
|---|---|---|---|---|
| 2010/0033616 | A1* | 2/2010 | Huang | H04N 5/2254 |
| | | | | 348/335 |
| 2012/0019940 | A1* | 1/2012 | Lu | H04N 5/2257 |
| | | | | 359/819 |
| 2017/0307841 | A1* | 10/2017 | Nakamura | G03B 43/00 |
| 2018/0024307 | A1* | 1/2018 | Lo | H04N 5/2257 |
| | | | | 348/335 |
| 2018/0364441 | A1* | 12/2018 | Hubert | H04N 5/2257 |
| 2019/0052782 | A1* | 2/2019 | Sung | B23K 26/32 |
| 2019/0179107 | A1* | 6/2019 | Hsu | G02B 7/09 |
| 2020/0348481 | A1* | 11/2020 | Toriumi | G02B 7/02 |

FOREIGN PATENT DOCUMENTS

| | | |
|---|---|---|
| JP | 2012-018204 A | 1/2012 |
| KR | 10-2003-0022742 A | 3/2003 |
| KR | 10-2012-0028073 A | 3/2012 |
| KR | 10-2013-0119195 A | 10/2013 |
| KR | 10-2017-0094730 A | 8/2017 |

OTHER PUBLICATIONS

Office Action dated Dec. 3, 2021 in Chinese Application No. 201980025010.1.
Office Action dated May 30, 2022 in Korean Application No. 10-2018-0042062.

* cited by examiner

10

CAMERA MODULE

CROSS-REFERENCE TO RELATED APPLICATIONS

This application is the U.S. national stage application of International Patent Application No. PCT/KR2019/004361, filed Apr. 11, 2019, which claims the benefit under 35 U.S.C. § 119 of Korean Patent Application No. 10-2018-0042062, filed Apr. 11, 2018, the disclosures of each of which are incorporated herein by reference in their entirety.

TECHNICAL FIELD

The present invention relates to a camera module.

BACKGROUND ART

Recently, miniature camera modules have been developed, and the miniature camera modules have been widely used in small electronic products such as smartphones, laptops, game machines, and the like.

As automobiles are widely supplied to the public, miniature cameras are widely used in vehicles as well as electronic products. For example, they are provided with a black box camera for the protection of a vehicle or for objective data of traffic accident, a rear surveillance camera that allow a driver to monitor the blind spot on the rear of the vehicle to ensure safety when the vehicle is backing up, a peripheral area detection camera for monitoring the vehicle's surroundings, and the like.

In general, in such a camera, a lens, a lens barrel accommodating a lens, a lens holder supporting the lens barrel, an image sensor that converts an image of a subject collected in the lens into an electrical signal, a printed circuit board (PCB) on which the image sensor is mounted, and the like may be disposed.

Meanwhile, if the coupling between the lens barrel, the lens holder, and the printed circuit board is not solid, a separation may occur between the optical axis of the lens and the optical axis of the image sensor, and the quality of the image or image obtained from the image sensor may be greatly degraded.

DETAILED DESCRIPTION OF THE INVENTION

Technical Subject

The problem to be solved by the present invention is to provide a camera module capable of enhancing the coupling strength between components.

Technical Solution

A camera module according to an aspect of the present invention comprises: a lens barrel accommodating a lens; a lens holder accommodating the lens barrel; an image sensor disposed under the lens barrel; and a printed circuit board having an image sensor mounted thereon and coupled to the lens holder, wherein the lens barrel and the lens holder are primarily coupled to each other in a state where an optical axis of the lens and an optical axis of the image sensor are aligned, and are secondarily coupled to each other in the primarily coupled state.

In addition, the lens barrel may comprise an accommodating portion for accommodating the lens, a plate formed to be extended from the accommodating portion and at least partially overlapped with an upper surface of the lens holder, and a coupling hole formed on the plate.

In addition, a lower surface of the plate and an upper surface of the lens holder facing the lower surface of the plate are primarily coupled, and the coupling hole and an upper surface of the lens holder facing the coupling hole may be secondarily coupled.

In addition, the lens barrel comprises a first soldering member formed on an inner side surface of the coupling hole, and the lens holder may comprise a second soldering member formed on an upper surface of the lens holder overlapped with the coupling hole.

In addition, the second soldering member may comprise a protruding member formed to be protruded toward the coupling hole.

In addition, the first and second soldering members may comprise low temperature soldering members able to be welded at a low temperature.

In addition, the coupling hole may be tapered such that a lower side is narrower than an upper side.

In addition, the primarily coupling includes an epoxy adhesive coupling and the secondarily coupling may include a soldering coupling.

A camera module according to another aspect of the present invention for achieving the above objective may comprise: a lens barrel accommodating a lens; a lens holder accommodating the lens barrel; a coupling portion disposed outside the lens barrel and the lens holder; an image sensor disposed under the lens barrel; and a printed circuit board having the image sensor mounted thereon and coupled to the lens holder, wherein the lens barrel and the lens holder are primarily coupled in a state where an optical axis of the lens and an optical axis of the image sensor are aligned, and wherein the coupling portion is secondarily coupled to the lens barrel and the lens holder in the primarily coupled state.

In addition, the coupling portion may comprise a first coupling member overlapped with the lens barrel and a second coupling member overlapped with the lens holder.

In addition, the lens barrel comprises a third soldering member formed on an outer side surface of the lens barrel overlapped with the first coupling member, and the lens holder may comprise a fourth soldering member formed on an outer side surface of the lens holder overlapped with the second coupling member.

In addition, the third and fourth soldering members may comprise low temperature soldering members able to be welded at a low temperature.

In addition, the first and second coupling members may be formed as a hole or a groove.

In addition, the hole or the groove may be tapered.

In addition, the lens barrel may comprise an accommodating portion for accommodating the lens, and a plate, formed to be extended from the accommodating portion, having at least a portion thereof overlapped with an upper surface of the lens holder.

In addition, a lower surface of the plate and an upper surface of the lens holder overlapped with the plate may be primarily coupled.

In addition, the primarily coupling includes an epoxy adhesive coupling and the secondarily coupling may include a soldering coupling.

In addition, the coupling portion may be formed of a material capable of welding.

A camera module according to another aspect of the present invention comprises: a lens barrel accommodating a lens; a lens holder coupled with the lens barrel; an image sensor disposed under the lens barrel; and a printed circuit board having an image sensor mounted thereon, wherein the lens holder and the printed circuit board are primarily coupled to each other in a state where an optical axis of the lens and an optical axis of the image sensor are aligned, and are secondarily coupled to each other in the primarily coupled state.

In addition, the primarily coupling includes an epoxy adhesive coupling and the secondarily coupling may include a soldering coupling.

Advantageous Effects

Through the present embodiments, it is possible to provide a camera module capable of enhancing the coupling strength between the components.

BEST MODE

Figure 1:
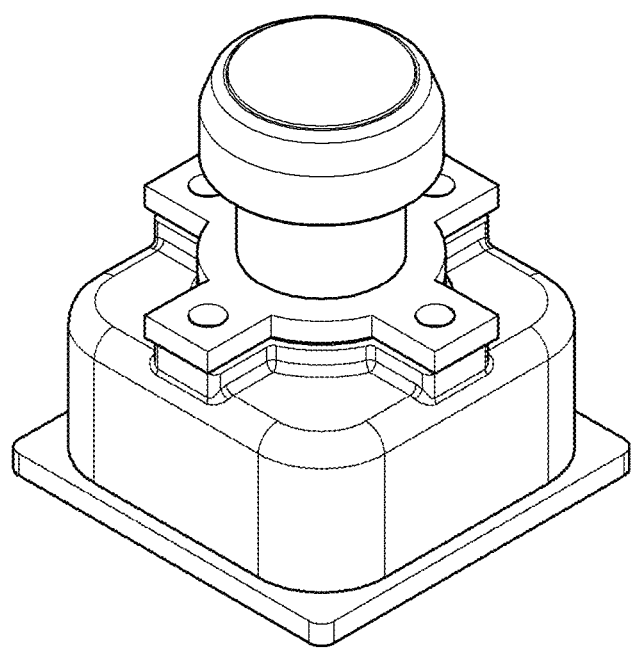
FIG. 1 is a perspective view of a camera module according to an embodiment of the present invention.

Hereinafter, exemplary embodiments of the present invention will be described in detail with reference to the accompanying drawings. Advantages and features of the present invention, and methods for achieving them will be apparent with reference to the exemplary embodiments described below in detail in conjunction with the accompanying drawings. However, the present invention is not limited to the exemplary embodiments disclosed below, but may be implemented in various different forms, and the present exemplary embodiments are merely provided to complete the disclosure of the present invention and to fully inform the scope of the invention to those skilled in the art to which the present invention belongs, and the present invention will be merely defined by the scope of the claims. Like refer to like elements throughout. Throughout the specification, the same reference numeral refers to the same component.

Unless otherwise defined, all terms (including technical and scientific terms) used in the present specification may be used in a meaning able to be commonly understood by those skilled in the art to which the present invention belongs. In addition, terms that are defined in commonly used dictionaries are not ideally or excessively interpreted unless they are specifically defined clearly.

In addition, the terms used in the exemplary embodiments of the present invention are intended to describe the exemplary embodiments and are not intended to limit the present invention. In this specification, the singular may also include the plural unless specifically stated in the text. As used in this specification, 'comprises' and/or 'comprising' means not to exclude the presence or addition of one or more other components, steps, and/or operations In addition to the components, steps, and/or operations mentioned. And "and/or" includes each and all combinations of one or more of the items mentioned.

In addition, in describing the components of the embodiment of the present invention, terms such as first, second, A, B, (a), and (b) may be used. These terms are merely intended to distinguish the components from other components, and the terms do not limit the nature, order or sequence of the components. When a component is described as being "connected", "combined", or "coupled" to another component, the component may be directly connected or coupled to the other component, however, it should be understood that another element may be "connected", "combined", or "coupled" between components.

The 'optical axis direction' used hereinafter is defined as the optical axis direction of the lens coupled to the lens driving device. Meanwhile, the 'optical axis direction' may correspond to the 'up and down' direction and the 'z axis direction.

Hereinafter, the present invention will be described in more detail with reference to the accompanying drawings.

Figure 2:
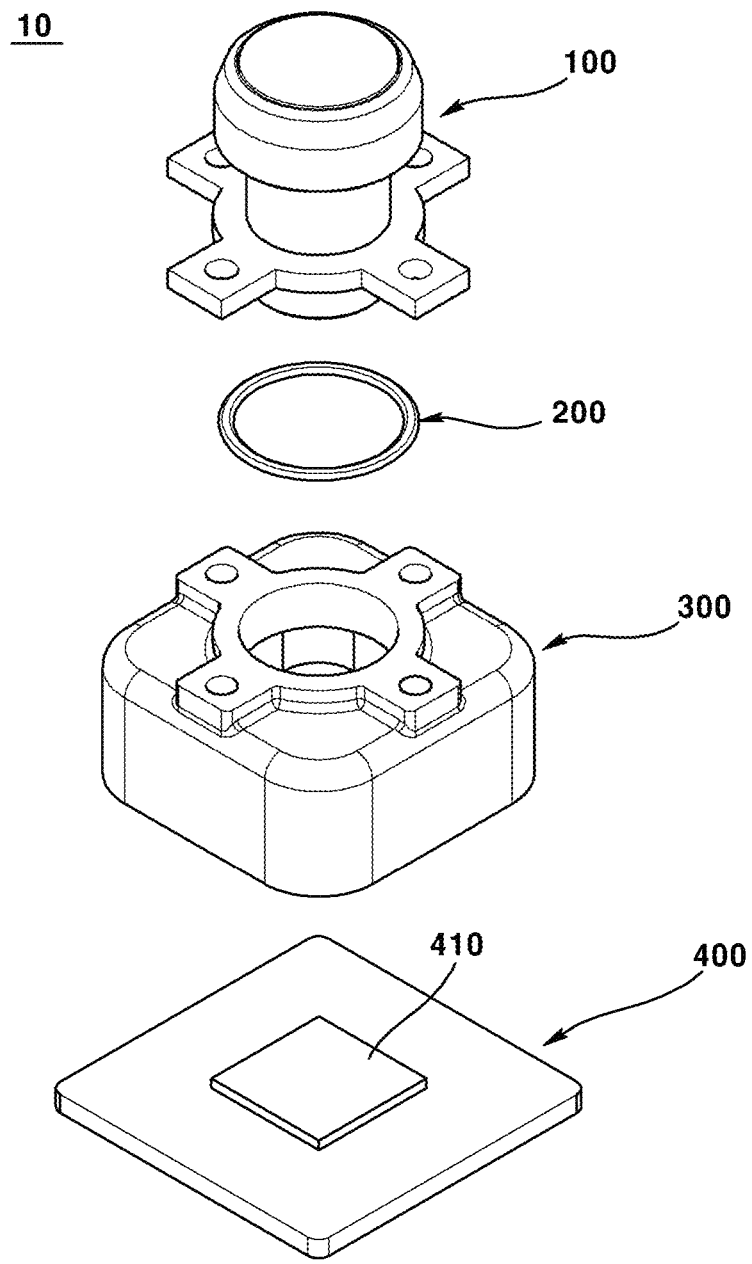
FIG. 2 is an exploded perspective view of a camera module according to an embodiment of the present invention.
Figure 3:
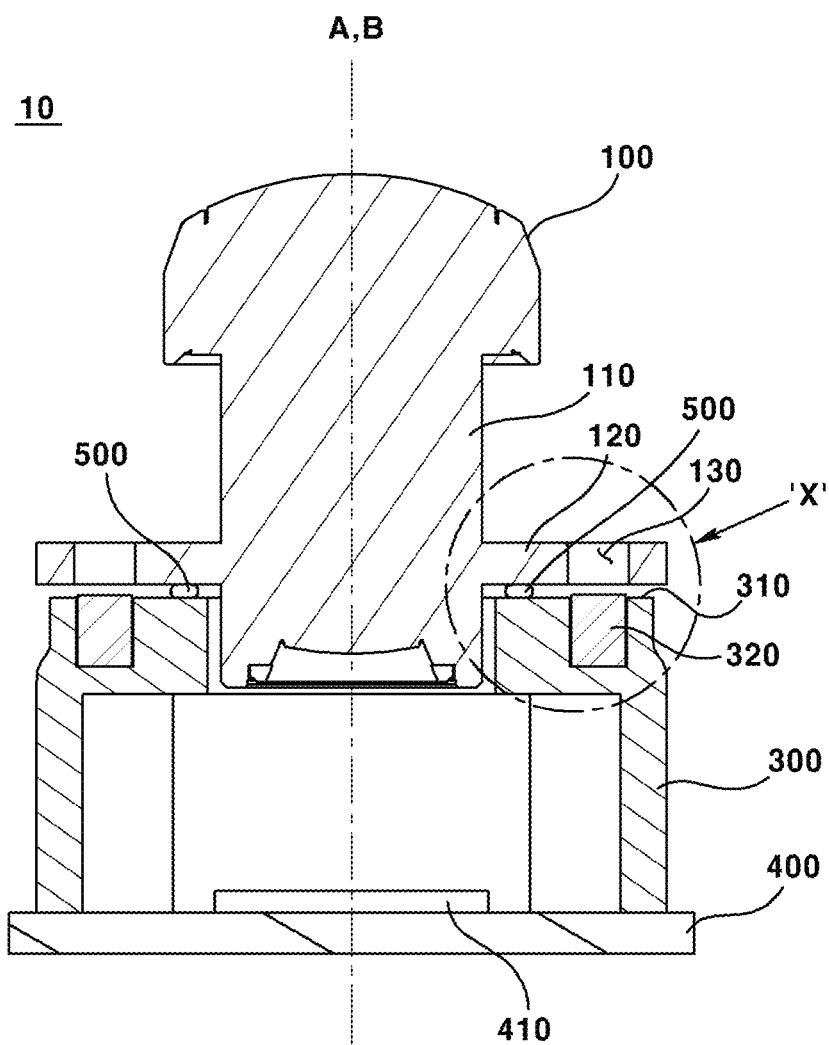
FIG. 3 is a cross-sectional view of a camera module according to an embodiment of the present invention.
Figure 4:
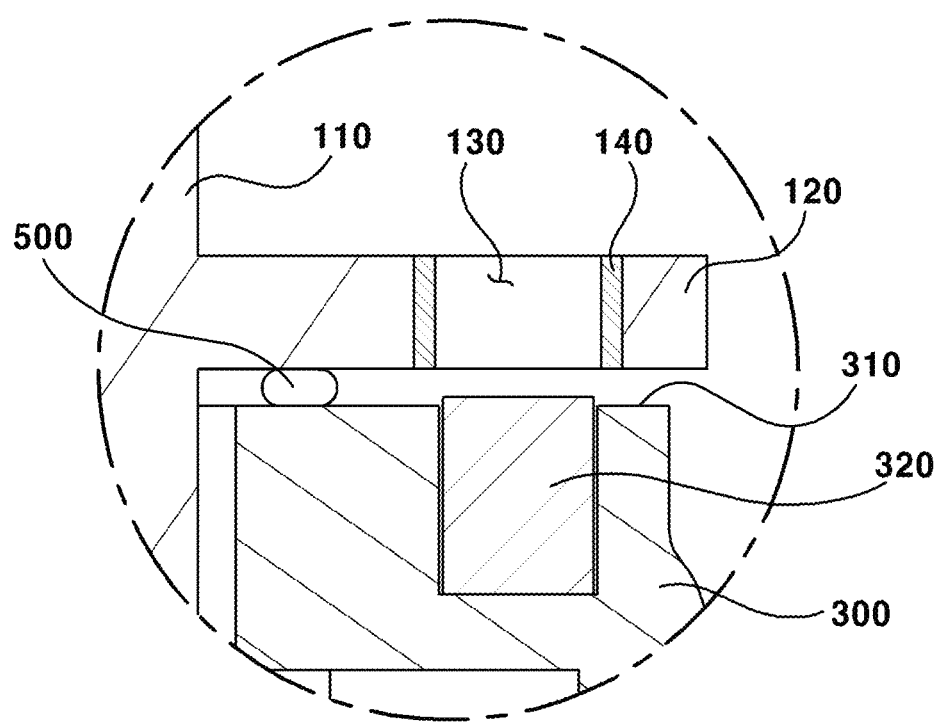
FIGS. 4 to 8 are enlarged views of portion X of FIG. 3.

FIG. 1 is a perspective view of a camera module according to an embodiment of the present invention, and FIG. 2 is an exploded perspective view of a camera module according to an embodiment of the present invention. FIG. 3 is a cross-sectional view of a camera module according to an embodiment of the present invention, and FIG. 4 is an enlarged view of portion X of FIG. 3.

Referring to FIGS. 1 to 4, a camera module 10 according to an embodiment of the present invention may comprise a lens barrel 100, a sealing ring 200, a lens holder 300, and a printed circuit board 400, but it may be implemented except some of these configurations, and does not exclude additional configurations.

The lens barrel 100 may comprise an accommodating portion 110, a plate 120, a coupling hole 130, and a first soldering member 140.

In one embodiment of the present invention, the lens barrel 100 may be formed by processing a metal material. At this time, the lens barrel 100 formed by processing a metal material may be coated with a non-metal material to inhibit diffuse reflection.

Although in one embodiment of the present invention the lens barrel 100 is described as being formed by processing a metal material and coated with a non-metal material, the lens barrel 100 may not be coated with a non-metal material, and it may be formed by processing only non-metal materials such as synthetic resin materials, or the like instead of metal materials.

The accommodating portion 110 of the lens barrel 100 may accommodate and fix a lens serving the role of providing an external light to an image sensor 410 mounted on a printed circuit board 400.

One lens or a plurality of lenses may be accommodated and fixed in the accommodating portion 110. In an embodiment of the present invention, the lens may be made of a synthetic resin material, a glass material, a quartz material, or the like, but is not limited thereto and may be made of various materials.

The accommodating portion 110 may be formed in a cylindrical shape to accommodate and fix the lens, but is not limited thereto and may be variously changed.

A plate 120 may be formed to be extended outward from the accommodating portion 110 with respect to the optical axis A of the lens. Referring to FIGS. 1 and 2, the plate 120 may be extended from the accommodating portion 110 in four directions. However, as long as it can be extended outwardly from the accommodating portion 110 with respect to the optical axis A of the lens, the shape of the plate 120 is not limited thereto and may be formed in various shapes such as a donut shape or the like.

At least a portion of the plate 120 may be overlapped with an upper surface 310 of the lens holder. At this time, the primarily and/or secondarily coupling between the lens barrel 100 and the lens holder 300 may be proceeded through an area of the plate 120 that is overlapped with the upper surface 310 of the lens holder. At this time, a certain gap may be formed between the plate 120 and the upper surface 310 of the lens holder.

A coupling hole 130 may be formed on the plate 120. Specifically, the coupling hole 130 may be formed in a region of the plate 120 that is overlapped with the upper surface 310 of the lens holder. Referring to FIGS. 2 and 3, the coupling hole 130 may be formed penetrating through the plate 120 in a vertical direction. However, as long as a space for a secondarily coupling, which will be described later, can be provided, the cross-section of the coupling hole 130 may be formed in a shape other than a circular shape, and may be formed in a groove shape on a lower surface of the plate 120.

A first soldering member 140 may be formed on an inner side surface of the coupling hole 130 for a secondarily coupling between the lens barrel 100 and the lens holder 300. Specifically, when the lens barrel 100 is processed with a metal material and coated with a non-metal material, the first soldering member 140 may be formed by peeling off the coated non-metal material from the inner side surface of the coupling hole 130. At this time, the first soldering member 140 may be integrally formed with the plate 120.

Unlike this, when the lens barrel 100 is processed and formed of a non-metallic material, the first soldering member 140 may be formed by being attached to the inner side surface of the coupling hole 130. At this time, the first soldering member 140 may be integrally formed with the plate 120, but may be manufactured separately from the lens barrel 100 and then assembled or coupled to the plate 120.

At this time, the first soldering member 140 is formed of a metal capable of soldering, such as a copper based or a gold plated metal, or the like. However, as long as the welding between the plate 120 of the lens barrel 100 and the upper surface 310 of the lens holder is possible, the material of the first soldering member 140 is not limited thereto and may be variously changed.

If the lens barrel 100 is formed of a metal material without being coated with a non-metal material, or the outer surface of the lens barrel 100 is coated with a metal material, a secondarily coupling is possible without the first soldering member 140.

In an embodiment of the present invention, the first soldering member 140 comprises a low temperature soldering member able to be welded at a low temperature (for example, between 200° C. and 300° C.). At this time, since welding is possible at a low temperature, shape changes of the lens barrel 100 and the lens holder 300 are not affected. However, as long as the shape changes of the lens barrel 100 and the lens holder 300 are not affected, the melting point of the first soldering member 140 is not limited thereto.

A sealing ring 200 may be disposed between the lens barrel 100 and the lens holder 300 to provide a strong coupling between the lens barrel 100 and the lens holder 300. In addition, the sealing ring 200 may be formed of an elastically deformable material such as rubber or the like. At this time, the sealing ring 200 removes the separation between the lens barrel 100 and the lens holder 300 that may occur due to the coupling of the lens barrel 100 and the lens holder 300, and thereby, it is possible to inhibit foreign substances from being flown into the lens holder 300.

The lens holder 300 may provide a space for accommodating the lens barrel 100, and the lens barrel 100 may be coupled to the lens holder 300. In addition, the lens holder 300 may be coupled to a printed circuit board 400, which will be described later.

The lens holder 300 may be made of a non-metal material such as a synthetic resin material using a plastic injection or die casting method. Although the lens holder 300 in an embodiment of the present invention is described as being made of a non-metal material, the lens holder 300 may be formed of a metal material, or may be formed of a metal material and coated with a non-metal material.

A hollow is formed in the lens holder 300, and a lens barrel 100 for accommodating a lens may be inserted into the hollow.

An upper surface 310 of the lens holder 300 may be formed to be extended outward from the hollow with respect to the optical axis A of the lens. At this time, a certain gap may be formed between the upper surface 310 of the lens holder and the plate 120. Referring to FIGS. 1 and 2, the upper surface 310 of the lens holder may be formed to be extended in four directions from the hollow. However, as long as it can be formed to be extended outward from the hollow with respect to the optical axis A of the lens, the shape of the upper surface 310 of the lens holder is not limited thereto, and may be formed in various shapes such as a donut shape or the like.

The lens holder 300 may comprise a second soldering member 320. Specifically, the second soldering member 320 may be formed on an upper surface 310 of the lens holder for a secondarily coupling between the lens barrel 100 and the lens holder 300.

When the lens holder 300 is formed of a non-metal material, the second soldering member 320 may be formed by being attached to the upper surface 310 of the lens holder. As illustrated in FIGS. 3 and 4, the second soldering member 320 may be inserted and attached to a groove provided in the upper surface 310 of the lens holder, but is not limited thereto. At this time, the second soldering member 320 may be integrally formed with the lens holder 300, but may be manufactured separately from the lens holder 300 and then attached to the upper surface 310 of the lens holder.

In this case, the second soldering member 320 is formed of a metal capable of soldering such as a copper based or a gold plated metal or the like. However, as long as the welding between the plate 120 of the lens barrel 100 and the upper surface 310 of the lens holder is possible, the material of the second soldering member 320 is not limited thereto and may be variously changed.

Alternatively, when the lens holder 300 is formed of a metallic material and coated with a non-metallic material, the second soldering member 320 may be formed by peeling off the coated non-metallic material. At this time, the second soldering member 320 may be integrally formed with the lens holder 300.

In the case when the lens holder 300 is formed of a metal material and not coated with a non-metal material, or if the upper surface 310 of the lens holder is coated with a metal material, a secondarily coupling is possible without the second soldering member 320.

In one embodiment of the present invention, the second soldering member 320 comprises a low temperature soldering member capable of welding at a low temperature. At this time, since welding is possible at a low temperature, shape changes of the lens barrel 100 and the lens holder 300 are not affected. However, as long as the shape changes of the lens barrel 100 and the lens holder 300 are not affected, the melting point of the second soldering member 320 is not limited thereto.

An image sensor 410 is disposed under the lens barrel 300. The image sensor 410 is disposed on a path of a light passing through the lens of the lens barrel 100. The image sensor 410 can convert light irradiated on the effective image area of the image sensor 410 into an electrical signal. The image sensor 410 may be any one of a charge coupled device (CCD), a metal oxide semi-conductor (MOS), a CPD, and a CID, but is not limited thereto.

An image sensor 410 is mounted on the printed circuit board 400. At this time, the image sensor 410 may be electrically connected to the printed circuit board 400. As an example, the image sensor 410 may be coupled to the printed circuit board 400 by a surface mounting technology (SMT). As another example, the image sensor 410 may be coupled to the printed circuit board 400 by a flip chip technology. The optical axis B of the image sensor 410 may be disposed to coincide with the optical axis A of the lens. That is, the optical axis B of the image sensor 410 and the optical axis A of the lens may be aligned with each other.

The printed circuit board 400 on which the image sensor 410 is mounted may be coupled to the lower surface of the lens holder 300 facing the upper surface 310 of the lens holder. In an embodiment of the present invention, the printed circuit board 400 may be coupled to the lens holder 300 by a fastening screw or the like.

The printed circuit board 400 may comprise a flexible printed circuit board (FPCB). At this time, the printed circuit board 400 may be partially bent.

In an embodiment of the present invention, the optical axis B of the image sensor 410 mounted on the printed circuit board 400 and the optical axis A of the lens coupled to the lens barrel 100 must be accurately aligned with each other. When the optical axis A of the lens and the optical axis B of the image sensor 410 are misaligned, the quality of an image or image obtained from the image sensor 410 may be significantly degraded.

The printed circuit board 400 may be made of a non-metal material. Although the printed circuit board 400 in an embodiment of the present invention is described as being made of a non-metal material, the printed circuit board 400 may be formed of a metal material, or may be formed of a metal material and coated with a non-metal material.

Hereinafter, the combination of the lens, lens barrel and the lens holder will be described.

FIGS. 5 to 8 are enlarged views of portion X of FIG. 3

Figure 5:
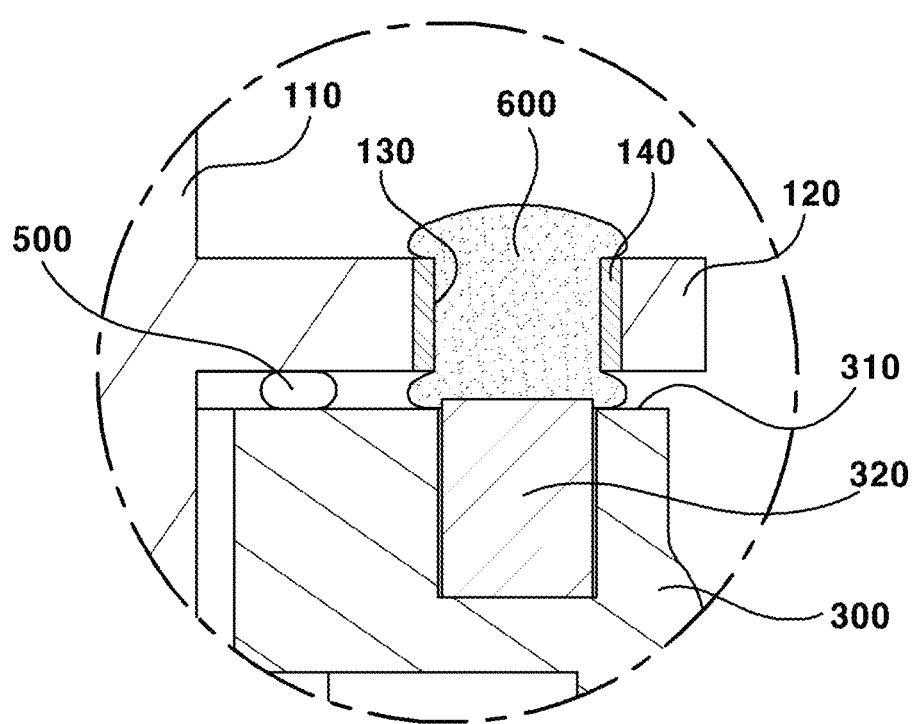

Referring to FIG. 5, in an embodiment of the present invention, in a state in which the optical axis A of the lens and the optical axis B of the image sensor 410 are aligned, the lens barrel 100 and the lens holder 300 are primarily coupled, and in the primarily coupled state, the lens barrel 100 and the lens holder 300 are secondarily coupled.

Specifically, in a state in which the printed circuit board 400 is fixed as the lens holder 300 is coupled, and the lens barrel 100 which is fixed as the lens is accommodated is accommodated in the lens holder 300, the alignment of the optical axis A of the lens and the optical axis B of the image sensor 410 is proceeded. In an embodiment of the present invention, an example is described in which the optical axis A of the lens and the optical axis B of the image sensor 410 are aligned through the movement of the lens barrel 100 and the lens holder 300, but is not limited thereto.

After the optical axis A of the lens and the optical axis B of the image sensor 410 are aligned, the plate 120 of the lens barrel 100 and the top surface 310 of the lens holder are primarily coupled in a primarily coupling region 500 between the lower surface of the plate 120 of the lens barrel 100 and the upper surface 310 facing the lower surface of the plate 120. At this time, the primarily coupling may include an epoxy adhesive coupling. Here, the epoxy adhesive coupling may be accomplished by intermediation of an epoxy resin including, for example, a photocurable material being cured by light, a thermosetting material being cured by heat, or a hybrid curable material being cured by light and heat.

After the primarily coupling, the plate 120 and the upper surface 310 of the lens holder are secondarily coupled in a secondarily coupling region 600 between a coupling hole 130 and the upper surface 310 of the lens holder facing the coupling hole 130. At this time, the secondarily coupling may include a soldering coupling. Here, the soldering coupling may be accomplished by a high-power laser beam or the like but is not limited thereto and may be accomplished by various welding methods.

In addition, the secondarily coupling may be accomplished by providing a high power laser beam to the first soldering member 140 and a second soldering member 320 formed of a metal material. At this time, the secondarily coupling may be accomplished by additionally providing a welding material, for example, a welding rod to the secondarily coupling region 600.

The coupling strength between the lens barrel 100 and the lens coupling 300 is enhanced through the secondarily coupling that is additionally performed after the primarily coupling. At this time, when the primarily coupling is accomplished through an epoxy coupling through the secondarily coupling, it is possible to inhibit the epoxy from being changed or detached due to external environmental factors such as heat or impact. In one embodiment of the present invention, the secondarily coupling region 500 may be formed inner side of the secondarily coupling region 600 with respect to the optical axis A of the lens, but is not limited thereto and may be variously changed.

Figure 6:
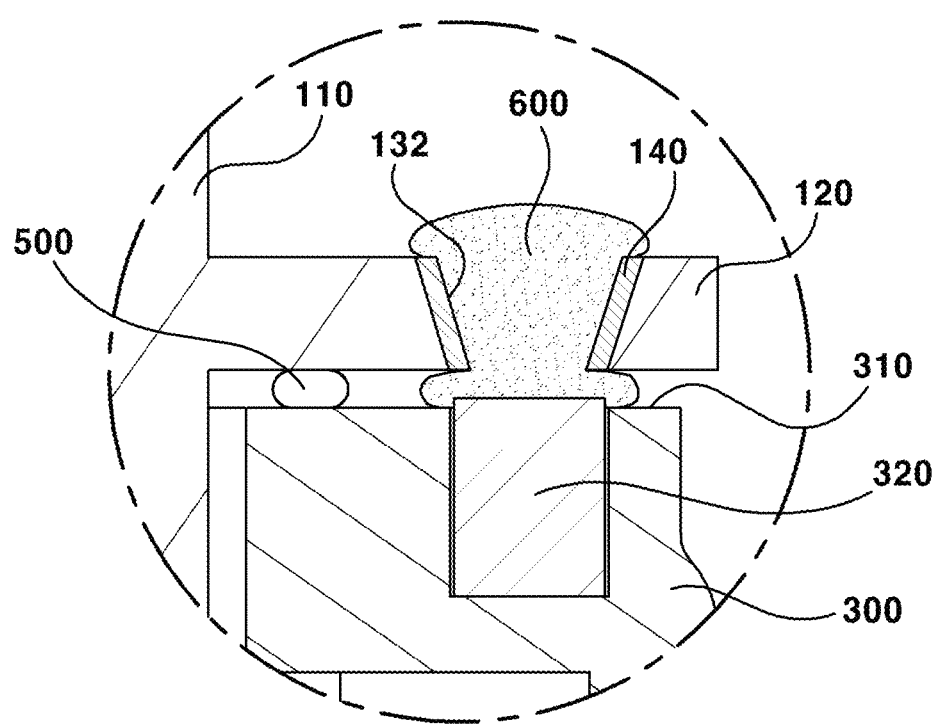

Referring to FIG. 6, the coupling hole 130 according to an exemplary embodiment of the present invention may be tapered such that the lower side is narrower than the upper side. Specifically, an inner side surface 132 of the coupling hole may be formed to be inclined so that the coupling hole 130 becomes narrower downward. In this case, since the contact area between the coupling hole 130 and the secondarily coupling region 600 is increased, the coupling force of the secondarily coupling can be enhanced. In one embodiment of the present invention, only a case where the coupling hole 130 is tapered to be narrower than the top is illustrated, but is not limited thereto, and the cross-section of the coupling hole 130 may be tapered in various shapes.

Figure 7:
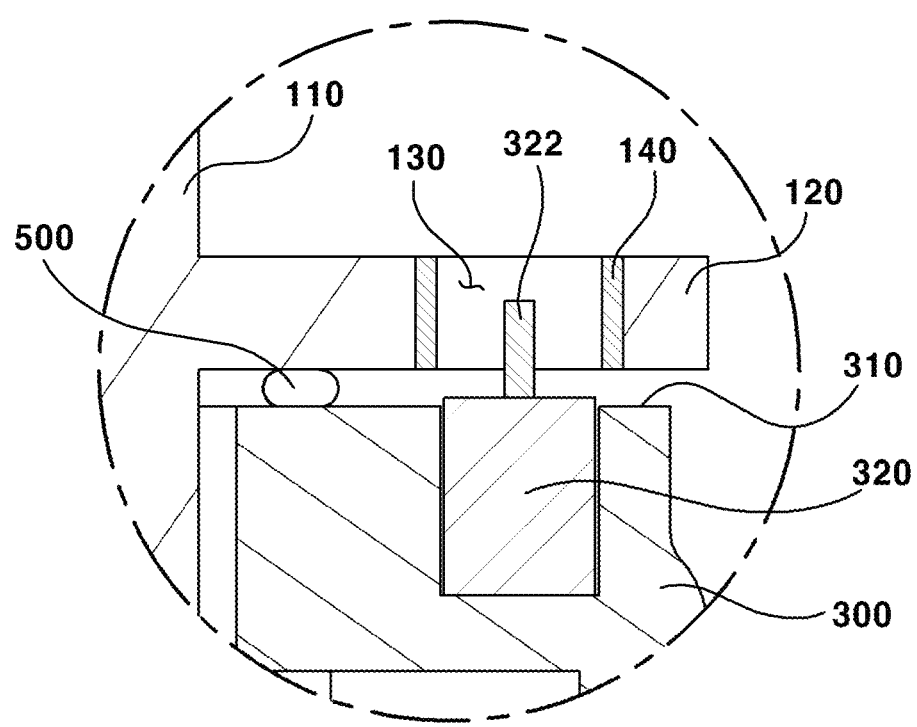
Figure 8:
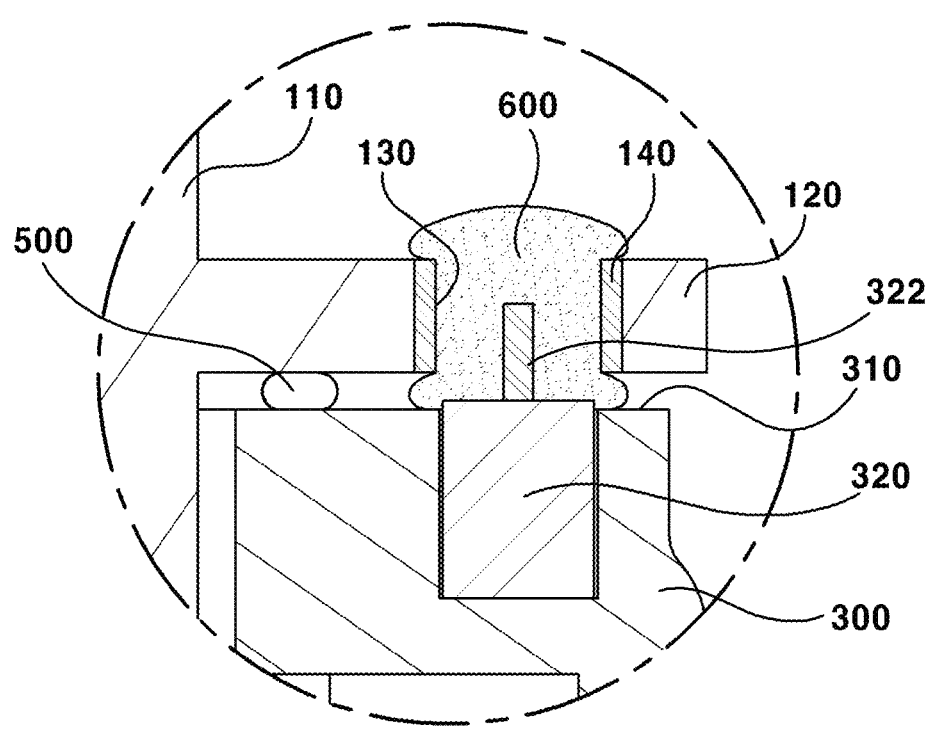

Referring to FIGS. 7 and 8, the second soldering member 320 may comprise a protruding member 322 formed to be protruded toward the coupling hole 130. In this case, since the contact area between the second soldering member 320 and the secondarily coupling region 600 is widened through the protruding member 322, the coupling force of the secondarily coupling can be enhanced. In one embodiment of the present invention, the protruding member 322 is illustrated only a case where it is protruded up to the middle region of the coupling hole 130, but is not limited thereto, and the protruding member 322 may be formed to penetrate the inside of the coupling hole 130, or may be formed to protrude toward the coupling hole 130 without penetrating the inside of the coupling hole 130.

The coupling strength between the lens barrel 100 and the lens holder 300 may be enhanced by the camera module 10 according to an embodiment of the present invention.

Figure 9:
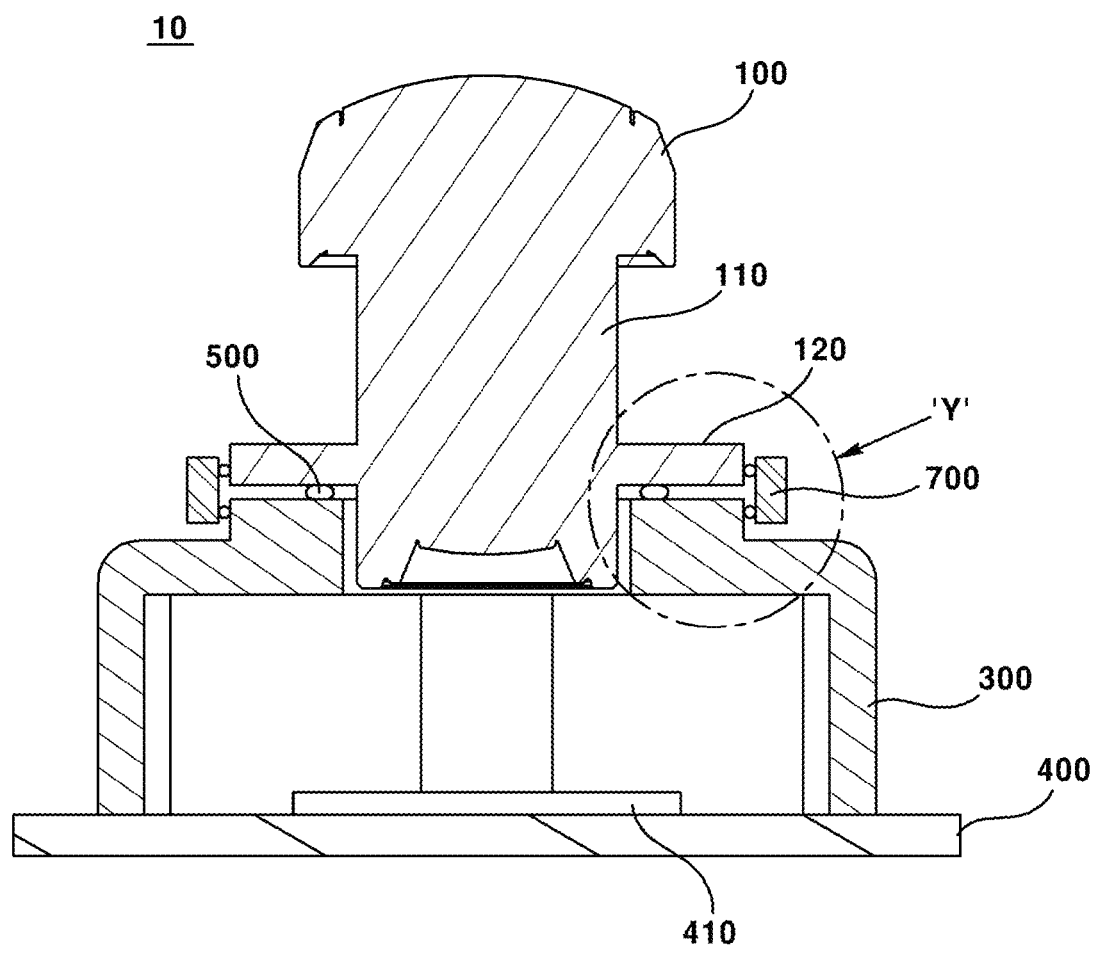
FIG. 9 is a cross-sectional view of a camera module according to another embodiment of the present invention.

FIG. 9 is a cross-sectional view of a camera module according to another embodiment of the present invention and FIGS. 10 to 16 are enlarged views of portion Y of FIG. 9.

Figure 10:
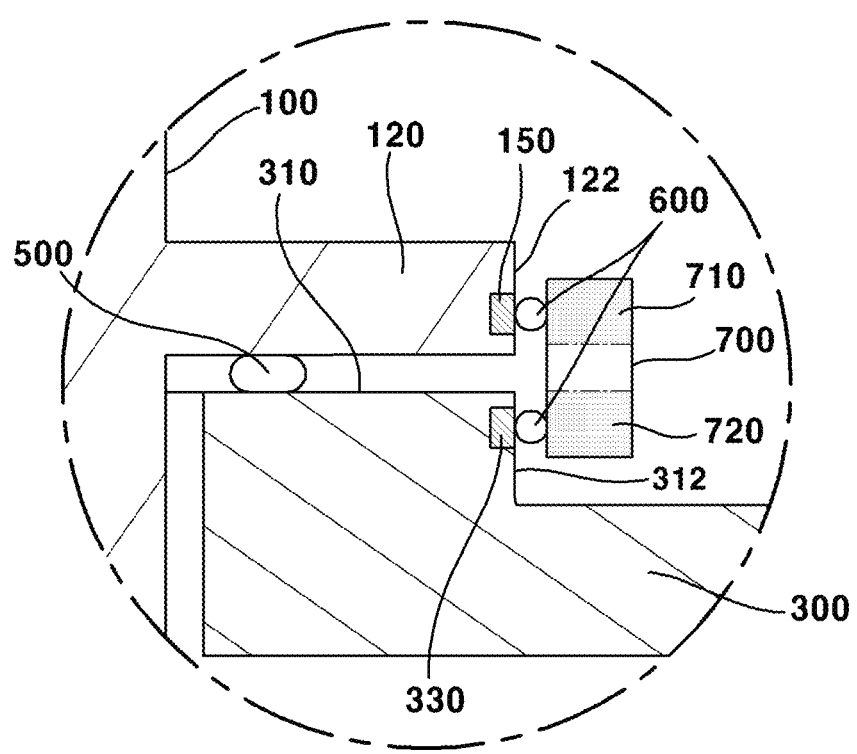
FIGS. 10 to 16 are enlarged views of portion Y of FIG. 9.

Referring to FIGS. 9 and 10, a camera module 10 according to another embodiment of the present invention comprises a lens barrel 100, a lens holder 300, a coupling portion 700 and an image sensor 410, a printed circuit board 400 is comprised, but does not exclude additional components. Redundant descriptions of the same components as those of the camera module 10 according to an embodiment of the present invention will be omitted, and the same names and the same reference numerals will be assigned to the same components.

The lens barrel 100 comprises an accommodating portion 110 for accommodating a lens, and a plate 120 formed to be extended from the accommodating portion 110 and at least partially overlapped with the upper surface 310 of the lens holder 300.

In a state where the optical axis A of the lens and the optical axis B of the image sensor 410 are aligned, the lens barrel 100 and the lens holder 300 are primarily coupled. Specifically, the lens barrel 100 and the lens holder 300 may be primarily coupled in a primarily coupling region 500 between the lower surface of the plate 120 and the upper surface 310 of the lens holder overlapped with the plate 120. In one and another embodiment of the present invention, the primarily coupling region 500 is illustrated to be located between the lower surface of the plate 120 and the upper surface 310 of the lens holder overlapped with the plate 120, but is not limited thereto, and instead, the position may be variously changed as long as it is a region in which an epoxy adhesive coupling can be proceeded between the lens barrel 100 and the lens holder 300.

A coupling portion 700 is disposed outside the lens barrel 100 and the lens holder 300. Specifically, with reference to the optical axis A of the lens, the coupling portion 700 may be disposed to be adjacent to the outer side surface 122 of the lens barrel 100 and the outer side surface 312 of the lens holder 300.

The coupling portion 700 may comprise a first coupling member 710 overlapped with the lens barrel 100 and a second coupling member 720 overlapped with the lens holder 300. At this time, the coupling portion 700 may be formed of a material capable of welding. For example, the first and second coupling members 710 and 720 may be formed of a metal capable of soldering such as a copper based or a gold plated metal.

At this time, the lens barrel 100 comprises a third soldering member 150 formed on the outer side surface 122 of the lens barrel overlapped with the first coupling member 710, and the lens holder 300 may comprise a fourth soldering member 330 formed on the outer side surface 312 of the lens holder overlapped with the second coupling member 720. It may be interpreted such that the third soldering member 150 is the same as the first soldering member 140, and the fourth soldering member 330 is the same as the second soldering member 320. At this time, the third and fourth soldering members 150 and 330 may comprise a low-temperature soldering member capable of welding at a low temperature, but the melting points of the third and fourth soldering members 150 and 330 are not limited to low temperatures, but variously can be changed.

In the primarily coupled state, the coupling portion 700 may be secondarily coupled to the lens barrel 100 and the lens holder 300. Specifically, the first coupling member 710 and the third soldering member 150 may be secondarily coupled, and the second coupling member 720 and the fourth soldering member 330 may be secondarily coupled. For example, the first coupling member 710 and the third soldering member 150 are secondarily coupled in the secondarily coupling region 600 between first coupling member 710 and the third soldering member 150 facing the first coupling member 710, and the second coupling member 720 and the fourth soldering member 330 are secondarily coupled in the secondarily coupling region 600 between the second coupling member 720 and the fourth soldering member 330 facing the second coupling member 720.

The camera module 10 according to another embodiment of the present invention can enhance the mechanical rigidity by coupling the lens barrel 100 and the lens holder 300 through a coupling portion 700 formed of a metal capable of soldering.

Figure 11:
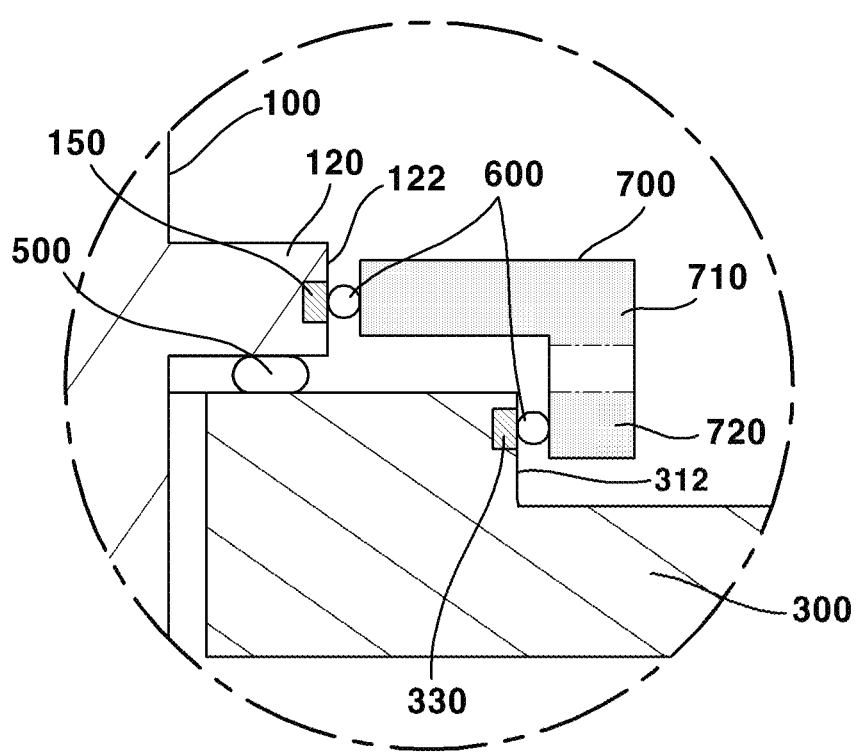

Referring to FIG. 11, the coupling portion 700 of the camera module 10 according to another embodiment of the present invention may be formed by being bent at least a portion thereof. In this case, even when the outer side surface 122 of the lens barrel 100 and the outer side surface 312 of the lens holder 300 are not positioned on the same vertical line, the secondarily coupling can be proceeded. However, as long as a secondarily coupling can be proceeded even when the outer side surface 122 of the lens barrel 100 and the outer side surface 312 of the lens holder 300 are not located on the same vertical line, the shape of the coupling portion 700 may be variously changed as well as at least a partially bent shape.

Figure 12:
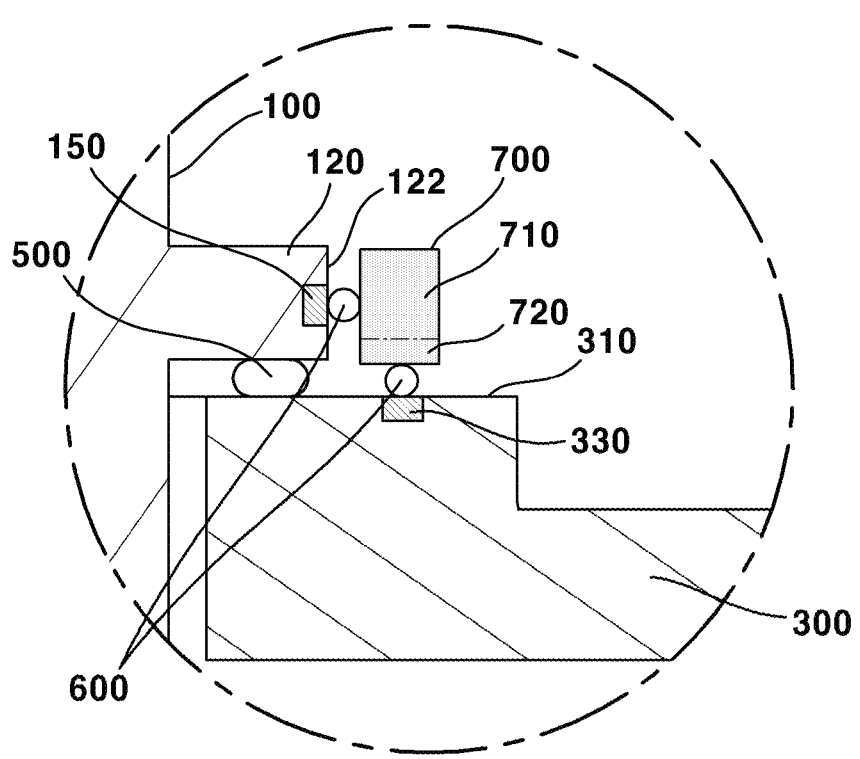

Referring to FIG. 12, the second coupling member 720 of the coupling portion 700 of the camera module 10 according to another embodiment of the present invention is overlapped with the upper surface 310 of the lens holder 300. In this case, the fourth soldering member 330 is located on the upper surface 310 of the lens holder. When the outer side surface 312 of the lens holder 300 is positioned outside the outer side surface 122 of the lens barrel 100 with respect to the optical axis A, the coupling portion 700 and the lens holder 300 are secondarily coupled in the secondarily coupling region 600 between the fourth soldering member 330 located on the upper surface 310 of the lens holder and the second coupling member 720 facing the fourth soldering member 330.

Referring to FIGS. 13 to 16, the first and second coupling members 710 and 720 of the camera module 10 according to another embodiment of the present invention may be formed as holes or grooves.

Figure 13:
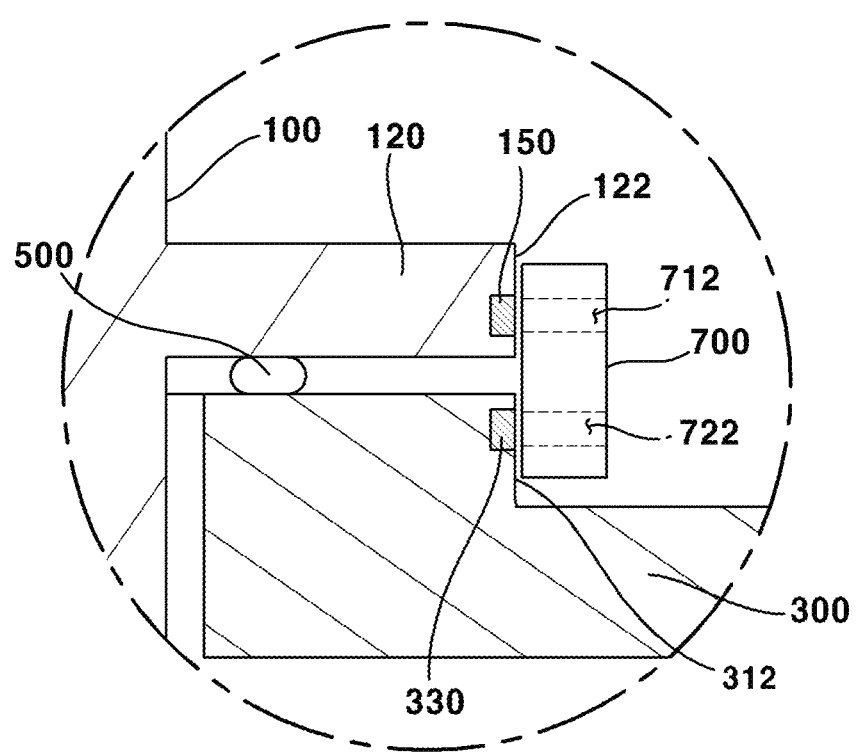
Figure 14:
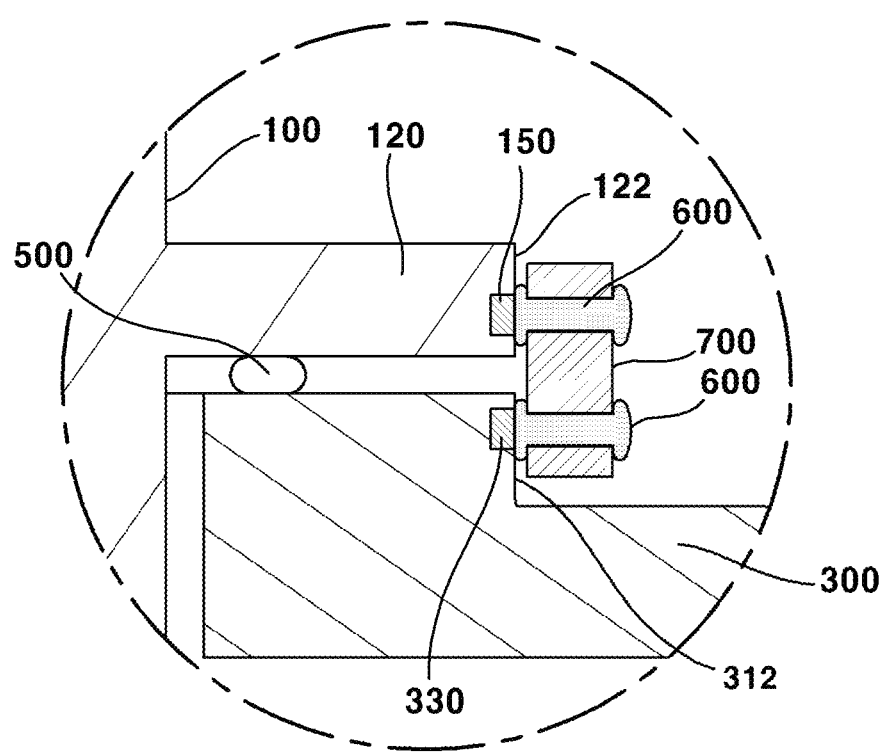

Referring to FIGS. 13 and 14, the first and second coupling members 712 and 722 are formed as holes. In this case, the secondarily coupling region 600 is formed between the third soldering member 150 and the first coupling member 712 formed as a hole, and formed between the fourth soldering member 330 and the second coupling member 722 formed as a hole.

Figure 15:
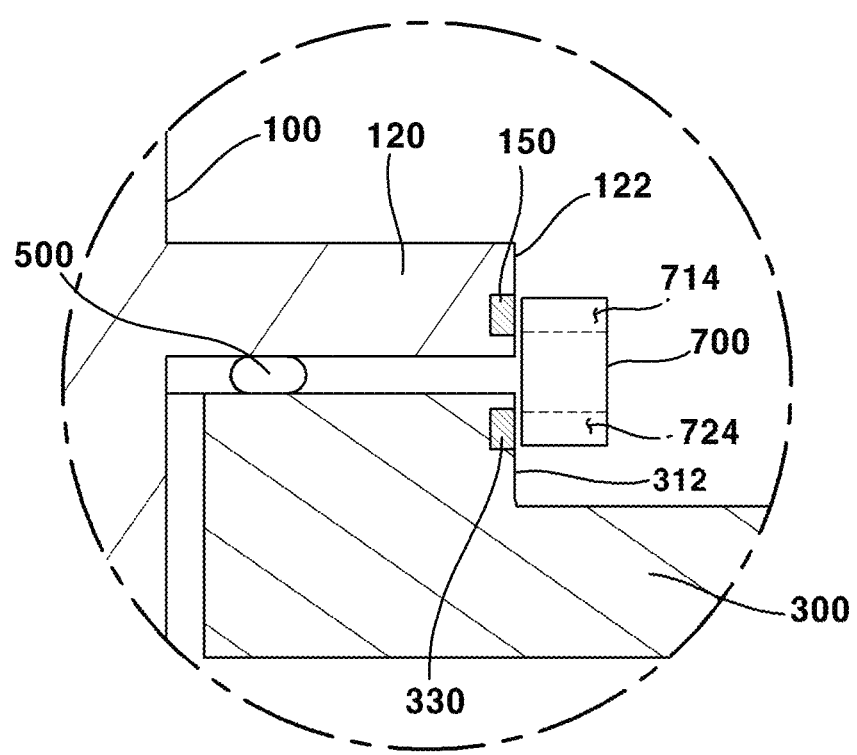
Figure 16:
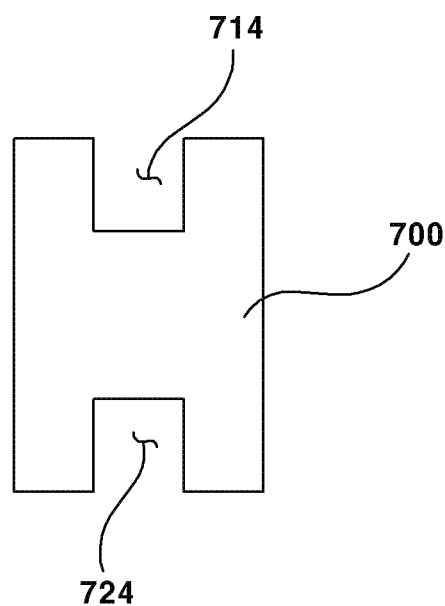

Referring to FIGS. 15 and 16, the first and second coupling members 714 and 724 are formed as grooves. In this case, the secondarily coupling region 600 is formed between the third soldering member 150 and the first coupling member 714 formed as a groove, and formed between the fourth soldering member 330 and the second coupling member 724 formed as a groove. In another embodiment of the present invention, the first and second coupling members 714 and 724 formed as grooves are described based on being located in the upper center and the lower center of the coupling portion 700, the positions of the first and second coupling members 714 and 724 formed as grooves are not limited thereto and may be variously changed.

In this way, the contact area between the first coupling members 712 and 714 and the secondarily coupling region 600 is increased, and the contact area between the second coupling members 722 and 724 and the secondarily coupling region 600 is increased, and thereby the coupling force of the secondarily coupling can be enhanced.

In addition, the first and second coupling members 712, 714, 722, and 724 formed in a hole or groove shape may be tapered. Specifically, the first and second coupling members 712, 714, 722, and 724 formed in a hole or groove shape may be tapered so that the area in contact with the secondarily coupling region to increase or decrease as the lens moves outward with respect to the optical axis A. Accordingly, the contact area between the secondarily coupling region 600 and the first coupling members 712 and 714 is increased, and the contact area between the secondarily coupling region 600 and the second coupling members 722 and 724 is increased, and thereby the coupling force of the secondarily coupling can be enhanced.

Hereinafter, the coupling of the lens, the lens holder, and the printed circuit board will be described.

Figure 17:
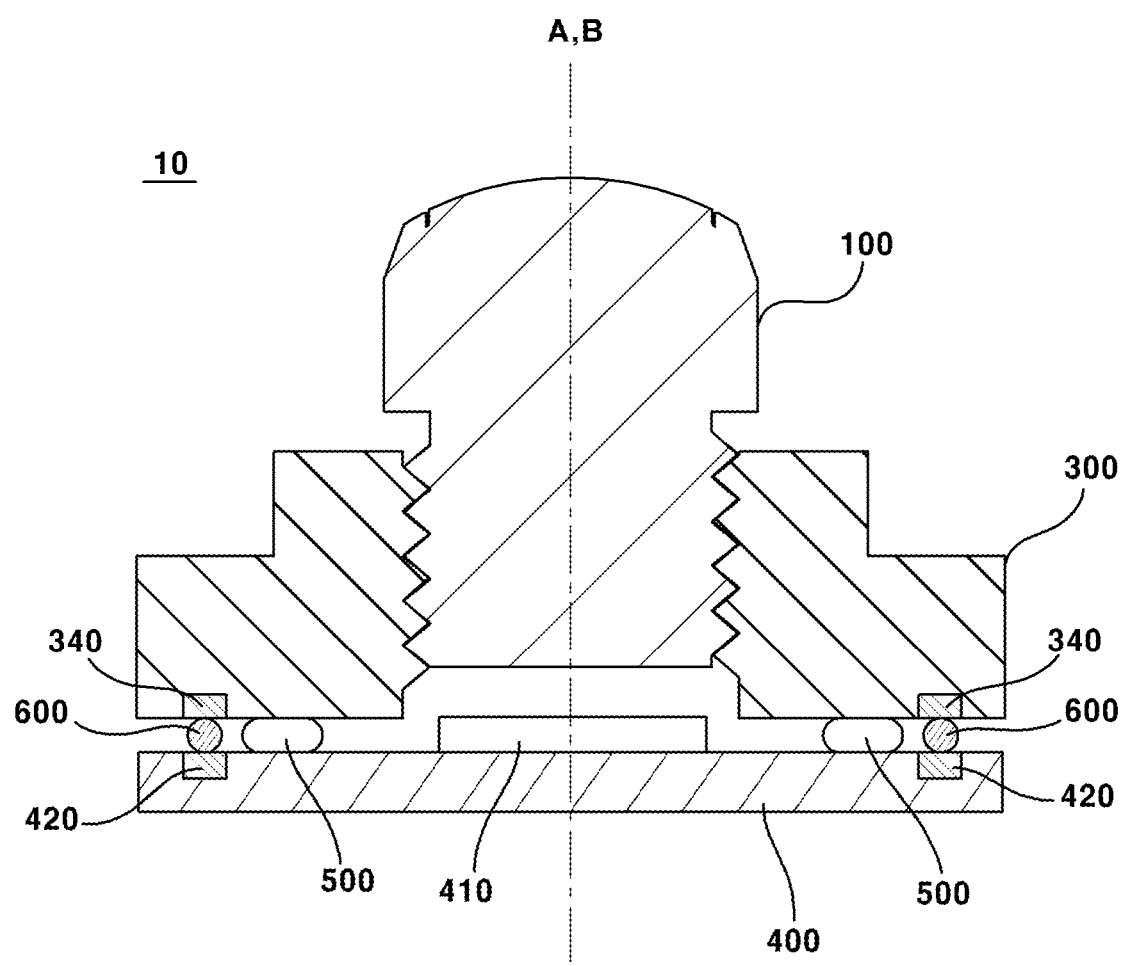
FIG. 17 is a cross-sectional view of a camera module according to another embodiment of the present invention.

FIG. 17 is a cross-sectional view of a camera module according to another embodiment of the present invention.

Referring to FIG. 17, a camera module 10 according to another embodiment of the present invention comprises a lens barrel 100, a lens holder 300, an image sensor 410, and a printed circuit board 400, but additional components other than this are not excluded. Redundant descriptions of the same components as those of the camera module 10 according to an embodiment of the present invention will be omitted, and the same names and the same reference numerals will be assigned to the same components.

The lens barrel 100 and the lens holder 300 of the camera module 10 according to another embodiment of the present invention may be coupled by a method such as a screw-coupling. Specifically, a male screw is formed on the outer side surface of the lens barrel 100 and a female screw may be formed on the inner side surface of the lens holder 300. At this time, the lens barrel 100 and the lens holder 300 can be coupled by the screw-coupling of the male screw and the female screw.

In addition, the printed circuit board 400 of the camera module 10 according to another embodiment of the present invention is not coupled with the lens holder 300 by fastening screws or the like. The lens holder 300 and the printed circuit board 400 are coupled by a primarily and secondarily couplings which will be described later.

In a state in which the optical axis A of the lens and the optical axis B of the image sensor 410 are aligned, the lens holder 300 and the printed circuit board 400 are primarily coupled, and in the primarily coupled state, the lens holder 300 and the printed circuit board 400 are secondarily coupled.

Specifically, in a state in which the lens barrel 100 and the lens holder 300 are coupled and fixed, alignment of the optical axis A of the lens and the optical axis B of the image sensor 410 is proceeded. In another embodiment of the present invention, an example is described in which the optical axis A of the lens and the optical axis B of the image sensor 410 are aligned through the movement of the lens holder 300 and the printed circuit board 400, but is not limited thereto.

After the optical axis A of the lens and the optical axis B of the image sensor 410 are aligned, the lens holder 300 and the printed circuit board 400 are primarily coupled in a primarily coupling region 100 formed between the lower surface of the lens holder 300 and the upper surface of the printed circuit board 400 facing the lower surface of the lens holder 300. At this time, the primarily coupling may include an epoxy adhesive coupling.

After the primarily coupling, the lens holder 300 and the printed circuit board 400 are secondarily coupled in a secondarily coupling region 600 formed between the lower surface of the lens holder 300 and the upper surface of the printed circuit board 400 facing the lower surface of the lens holder 300. At this time, the secondarily coupling may include a soldering coupling.

In addition, a lower surface of the lens holder 300 may comprise a fifth soldering member 340, and an upper surface of the printed circuit board 400 may comprise a sixth soldering member 420. At this time, the fifth soldering member 340 and the sixth soldering member 420 may be formed at positions facing each other. The fifth soldering member 340 may be interpreted as the same as the second soldering member 320.

When the printed circuit board 400 is formed of a non-metal material, the sixth soldering member 420 may be formed by being attached to the upper surface 310 of the printed circuit board 400. As illustrated in FIG. 17, the sixth soldering member 420 may be inserted and attached to a groove provided on the upper surface of the printed circuit board 400, but is not limited thereto. At this time, the sixth soldering member 420 may be integrally formed with the printed circuit board 400, but may be manufactured separately from the printed circuit board 400 and then attached to the upper surface of the printed circuit board 400.

In this case, the sixth soldering member 420 is formed of a metal capable of soldering such as copper based or gold plated metal. However, as long as the welding between the upper surface of the printed circuit board 400 and the lower surface of the lens holder 300 is possible, the material of the sixth soldering member 420 is not limited thereto and may be variously changed.

Unlike this, when the printed circuit board 400 is formed of a metallic material and coated with a non-metallic material, the sixth soldering member 420 may be formed by peeling off the coated non-metallic material. At this time, the sixth soldering member 420 may be integrally formed with the printed circuit board 400.

If the printed circuit board 400 is formed of a metal material and is not coated with a non-metal material, or the upper surface of the printed circuit board 400 is coated with a metal material, a secondarily coupling is possible without the sixth soldering member 420.

When the lens holder 300 is formed on the fifth soldering member 340 and the sixth soldering member 420 is formed on the printed circuit board 400, a secondarily coupling is accomplished in the secondarily coupling region 600 between the fifth soldering member 340 and the sixth soldering member 420. At this time, the secondarily coupling region 600 may be located outside a primarily coupling region 500 with respect to the optical axis A of the lens.

In another embodiment of the present invention, the sixth soldering member 420 comprises a low temperature soldering member capable of welding at a low temperature. At this time, since welding is possible at a low temperature, shape changes of the printed circuit board 400 are not affected. However, as long as the shape changes of the printed circuit board 400 are not affected, the melting point of the sixth soldering member 420 is not limited thereto.

The coupling strength between the lens holder 300 and the printed circuit board 400 can be enhanced by the camera module 10 according to another embodiment of the present invention.

Although the embodiments of the present invention have been described above with reference to the accompanying drawings, those skilled in the art to which the present invention belongs may understand that the present invention can be implemented into other specific forms without changing the technical spirit or essential features thereof. Therefore, it should be understood that the embodiments described above are exemplary in all respects and not restrictive.

The invention claimed is:

1. A camera module comprising:
a lens barrel accommodating a lens;
a lens holder accommodating the lens barrel;
an image sensor disposed under the lens barrel; and
a printed circuit board having the image sensor mounted thereon and coupled to the lens holder,
wherein the lens barrel and the lens holder are primarily coupled to each other in a state where an optical axis of the lens and an optical axis of the image sensor are aligned, and are secondarily coupled to each other in the primarily coupled state, and
wherein the lens barrel comprises an accommodating portion for accommodating the lens, a plate formed to be extended from the accommodating portion for having at least a portion overlapped with an upper surface of the lens holder, a coupling hole formed on the plate, and a first soldering member formed on an inner lateral surface of the coupling hole, the coupling hole being filled with a coupling material having lateral surfaces contacting inner lateral surfaces of the first soldering member.

2. The camera module according to claim 1, wherein a lower surface of the plate and the upper surface of the lens holder facing the lower surface of the plate are primarily coupled, and
wherein the coupling hole and the upper surface of the lens holder are secondarily coupled, and the upper surface of the lens holder also faces the coupling hole.

3. The camera module according to claim 1,
wherein the lens holder comprises a second soldering member formed on an upper surface of the lens holder overlapped with the coupling hole.

4. The camera module according to claim 3, wherein the second soldering member comprises a protruding member formed to be protruded toward the coupling hole.

5. The camera module according to claim 3, wherein the first and second soldering members comprise low temperature soldering members weldable at a low temperature.

6. The camera module according to claim 1, wherein the coupling hole is tapered such that a lower side is narrower than an upper side.

7. The camera module according to claim 1, wherein the primarily coupling includes an epoxy adhesive coupling and the secondarily coupling includes a soldering coupling.

8. A camera module comprising:
a lens barrel accommodating a lens;
a lens holder accommodating the lens barrel;
a coupling portion disposed outside the lens barrel and the lens holder;
an image sensor disposed under the lens barrel; and
a printed circuit board having the image sensor mounted thereon and coupled to the lens holder,
wherein the lens barrel and the lens holder are primarily coupled to each other in a state where an optical axis of the lens and an optical axis of the image sensor are aligned,
wherein the coupling portion is secondarily coupled to the lens barrel and the lens holder in the primarily coupled state, and
wherein the lens barrel comprises an accommodating portion for accommodating the lens, a plate formed to be extended from the accommodating portion for having at least a portion overlapped with an upper surface of the lens holder, a coupling hole formed on the plate, and a first soldering member formed on an inner lateral surface of the coupling hole, the coupling hole being filled with a coupling material having lateral surfaces contacting inner lateral surfaces of the first soldering member.

9. The camera module according to claim 8, wherein the coupling portion comprises a first coupling member overlapped with the lens barrel and a second coupling member overlapped with the lens holder.

10. The camera module according to claim 9, wherein the lens barrel comprises a third soldering member formed on an outer side surface of the lens barrel overlapped with the first coupling member, and
wherein the lens holder comprises a fourth soldering member formed on an outer side surface of the lens holder overlapped with the second coupling member.

11. The camera module according to claim 10, wherein the third and the fourth soldering members comprise low temperature soldering members weldable at a low temperature.

12. The camera module according to claim 9, wherein the first and second coupling members are formed as a hole or a groove.

13. The camera module according to claim 12, wherein the hole or the groove is tapered.

14. The camera module according to claim 8, wherein a lower surface of the plate and the upper surface of the lens holder overlapped with the plate are primarily coupled.

15. The camera module according to claim 8, wherein the primarily coupling includes an epoxy adhesive coupling and the secondarily coupling includes a soldering coupling.

16. The camera module according to claim 8, wherein the coupling portion is formed of a weldable material.

17. A camera module comprising:
a lens barrel accommodating a lens;
a lens holder coupled with the lens barrel;
an image sensor disposed under the lens barrel; and
a printed circuit board having the image sensor mounted thereon,
wherein the lens holder and the printed circuit board are primarily coupled to each other in a state where an optical axis of the lens and an optical axis of the image sensor are aligned, and are secondarily coupled to each other in the primarily coupled state, and
wherein the lens barrel comprises an accommodating portion for accommodating the lens, a plate formed to be extended from the accommodating portion for having at least a portion overlapped with an upper surface of the lens holder, a coupling hole formed on the plate, and a first soldering member formed on an inner lateral surface of the coupling hole, the coupling hole being filled with a coupling material having lateral surfaces contacting inner lateral surfaces of the first soldering member.

18. The camera module according to claim 17, wherein the primarily coupling includes an epoxy adhesive coupling and the secondarily coupling includes a soldering coupling.

\* \* \* \* \*